May 6, 1958 A. E. DRISSNER ET AL 2,833,023
TOOL TURRET INDEXING MECHANISM
Filed Jan. 21, 1953 5 Sheets-Sheet 1

INVENTORS,
ALFRED E. DRISSNER
ARTHUR C. CORDRAY
BY

May 6, 1958 A. E. DRISSNER ET AL 2,833,023
TOOL TURRET INDEXING MECHANISM
Filed Jan. 21, 1953 5 Sheets-Sheet 2

INVENTORS,
ALFRED E. DRISSNER
ARTHUR C. CORDRAY
BY

May 6, 1958 A. E. DRISSNER ET AL 2,833,023
TOOL TURRET INDEXING MECHANISM
Filed Jan. 21, 1953 5 Sheets-Sheet 4

INVENTORS,
ALFRED E. DRISSNER
ARTHUR C. CORDRAY
BY
Woodling and Krost,
Attys.

United States Patent Office 2,833,023
Patented May 6, 1958

2,833,023

TOOL TURRET INDEXING MECHANISM

Alfred E. Drissner and Arthur C. Cordray, Cleveland, Ohio, assignors to The National Acme Company Application January 21, 1953, Serial No. 332,212

7 Claims. (Cl. 29—37)

The invention relates in general to automatic machine tools, and more particularly to an improved indexing mechanism for a turret on an automatic machine tool.

The invention is shown as being applied to a single-spindle automatic bar machine tool having a turret. In this case the turret is five-sided and carries slides on each of the faces for successive operation of tools carried thereby with a workpiece turned in the spindle of the machine tool. Heretofore many automatic machine tools had a main cam drum turned slowly and geared with the spindle, and this main cam drum controlled all movements of the various slides, indexing of the turret, and the stock feed mechanism.

The instant invention relates to an indexing mechanism which is not operated by the main cam drum, rather it provides a separate indexing power source and drive train which is controlled by the movement of the turret. The indexing starts upon completion of the feed out and return of the turret slide, then the indexing is rapidly completed. All feed movement of the turret slides may be stopped during indexing for safety reasons and also to save time and space on the main cam drum. Further, the indexing may be carried out in a very short period of time, and the turret again locked in position before the main cam drum and feed starts for the next tool operation. Previously, the spindle speed and cam drum speed could be increased during the indexing operations in order to save time; this, however, still did not save much total time for indexing. Also, previously, in many machine tools, the separate forming and cut-off slides could not be operated during indexing. In the instant invention the forming and cut-off slides can continuously perform their work independently from the turret. Therefore, it is possible to have two or three end operations with the turret tools while the forming or cut-off tools remain engaged with the workpiece.

An object of the invention is to provide an independently operated turret indexing mechanism on an automatic machine tool.

Another object of the invention is to provide a mechanism to index the turret without rotation of the main cam drum of the machine tool.

Another object of the invention is to provide a machine tool having a turret indexed by a Geneva gear.

Another object of the invention is to provide an independent motor for turret indexing.

Another object of the invention is to provide a turret on a machine tool which is clamped at both ends.

Another object of the invention is to provide an indexing motor for a turret with a drive train therebetween, including a clutch and brake alternately operated with the clutch being engaged when a clamp on the turret is released.

Another object of the invention is to provide an independent indexing power drive for a turret which is placed in operation upon the completion of the feed-out and return movement of the turret slide.

Another object of the invention is to prevent feed of the turret slide upon initiation of the turret indexing.

Another object of the invention is to provide safety switch controls to prevent initiation of turret slide feed until completion of the turret indexing.

Other objects and a fuller understanding of this invention may be had by referring to the following description and claims, taken in conjunction with the accompanying drawings, in which:

Figure 1:
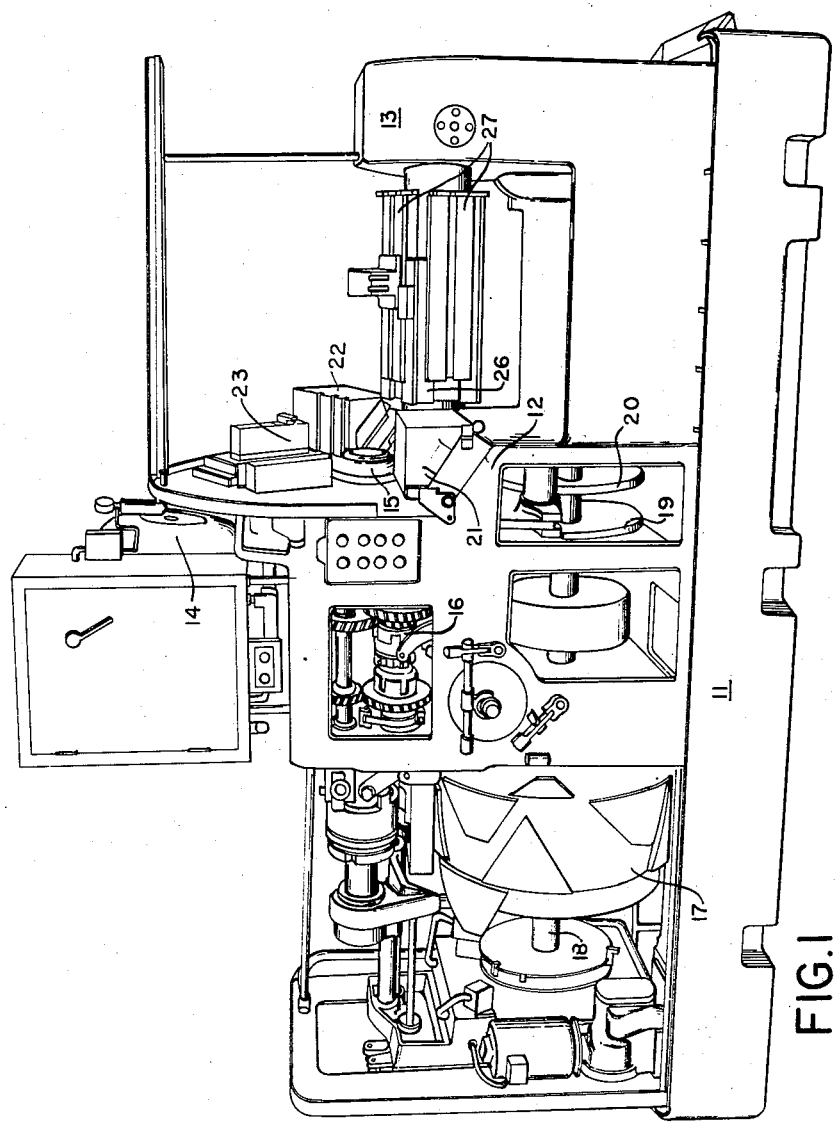
Figure 1 is a front view of a single-spindle automatic machine tool embodying the turret indexing mechanism of the invention.

Figure 1 shows a front view of the automatic machine tool 11 having a main frame 12 and an outer support 13. A main drive motor 14 supplies power through suitable gear reductions to rotate a spindle 15, and through a feed range clutch 16 and additional gearing slowly rotates a main cam drum 17. The cam drum 17 is attached to a main cam shaft 18 which also carries thereon disc cams 19 and 20 to operate a front forming slide 21, a rear forming slide 22, and a cut-off slide 23. A turret 26 is journalled in the machine and carries a plurality of tool slides 27.

Figure 2:
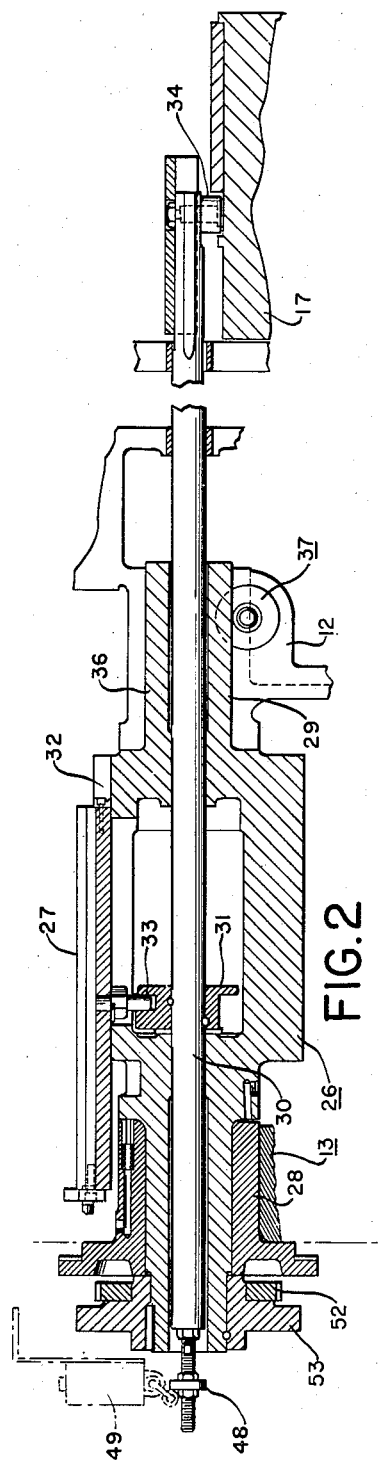
Figure 2 is a sectional view of the turret mechanism.

The Figure 2 better shows the turret 26. A bearing 28 in the outer support 13 and a bearing 29 in the main frame 12 journal this turret 26 for rotation. The turret 26 is hollow and contains a draw rod 30. A draw sleeve 31 is fastened to the draw rod 30. Each of the tool slides 27 reciprocates in ways 32. A stud 33 on each slide 27 is engageable with the draw sleeve 31 so that the particular slide in operation reciprocates with the draw rod 30. One end of the draw rod 30 carries a cam follower roller 34 which co-operates with cams on the main cam drum 17.

Figure 3:
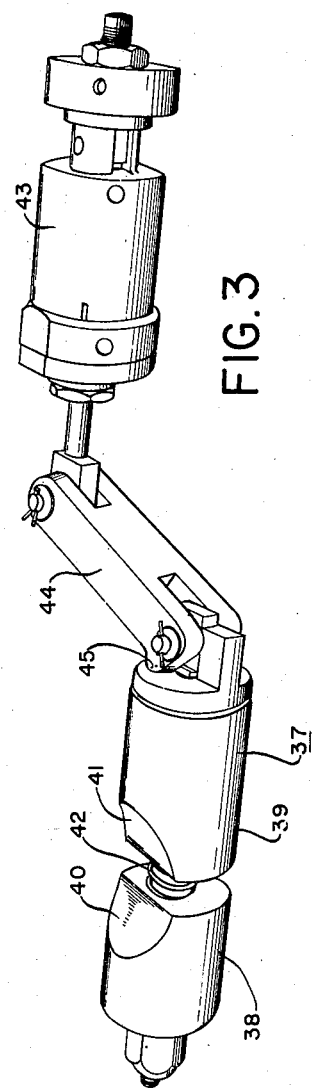
Figure 3 is a perspective view of the turret clamp mechanism.

The turret 26 has a cylindrical extension 36 which is journalled in the bearing 29; and further, a clamp mechanism 37 co-operates with this cylindrical extension 36. This clamp mechanism is better shown in Figure 3 and includes first and second shoes 38 and 39 having partially cylindrical faces 40 and 41. A spring 42 separates the shoes 38 and 39, and they are urged together by an air cylinder 43 acting through a lever 44 and toggle cam 45.

A switch actuating disc 48 is adjustably carried on one end of the draw rod 30 and actuates a first limit switch 49. This limit switch 49 is that which controls the initiation of the indexing movement.

Figure 4:
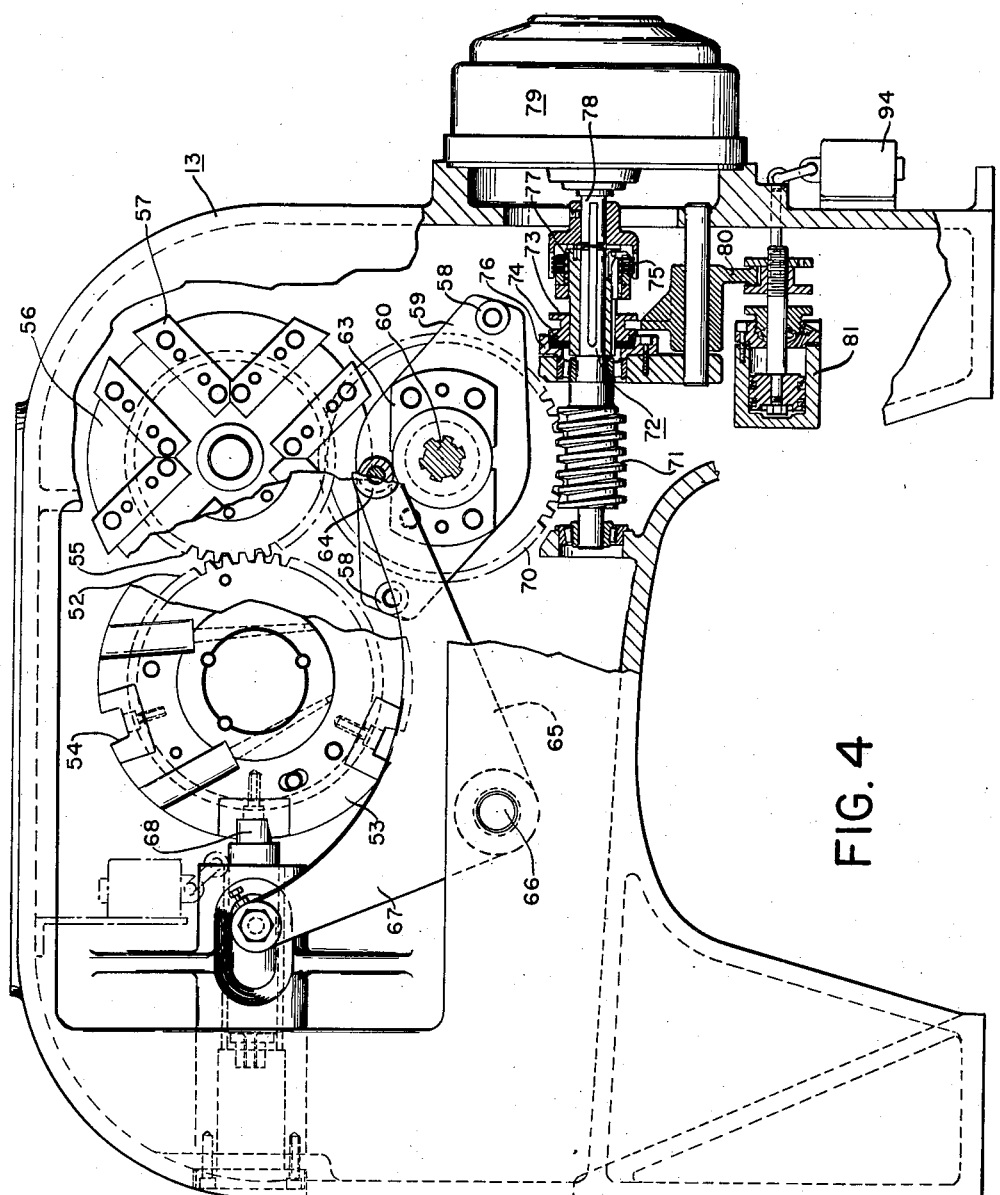
Figure 4 is an end view, partially cut away, of the machine tool.

The Figure 4 better shows the main parts of the indexing mechanism. An indexing gear 52 and an indexing disc 53 are fixedly attached to the turret 26 for rotation therewith. The indexing disc has a plurality of notches 54, and in this case there are five notches since a five-face turret is shown. A drive gear 55 meshes with the indexing gear 52. Coaxial with and fixed to the drive gear 55 is a Geneva gear 56. Roller guides 57 are fastened to the Geneva gear 56 and co-operate with cam rollers 58. There are two cam rollers 58 on a double-ended rotary arm 59. This rotary arm 59 is fastened to a shaft 60 journalled in the outer support 13. A 180 degree rotation of the rotary arm 59 causes a 90 degree rotation of the Geneva gear 56; and because of the 4:5 ratio of the drive gear and indexing gears, the indexing disc 53 is rotated 72 degrees.

A double-ended locking cam 63 is fastened coaxially to the rotary arm 59 for rotation therewith. This locking cam 63 co-operates with a cam roller 64 on a locking bolt lever 65. The lever 65 is pivoted at 66, and the other end 67 of the lever 65 moves a lock bolt 68 into and out of engagement with any one of the notches 54.

The rotary arm 59 and locking cam 63 are fixed to a worm wheel 70 which is driven by a worm 71. A clutch and brake assembly 72 includes a sliding shoe 73 carrying a brake disc 74 and clutch discs 75. The brake shoe 74 co-operates with a brake drum 76 fixed to the outer support 13. In the alternate position of the shoe 73, the clutch discs 75 co-operate with clutch facings 77 carried on and driven by a motor shaft 78, in turn driven by an indexing electric motor 79. A shifting fork 80 moves the sliding shoe 73, and this shifting fork is moved by a pneumatic cylinder 81.

Figure 5:
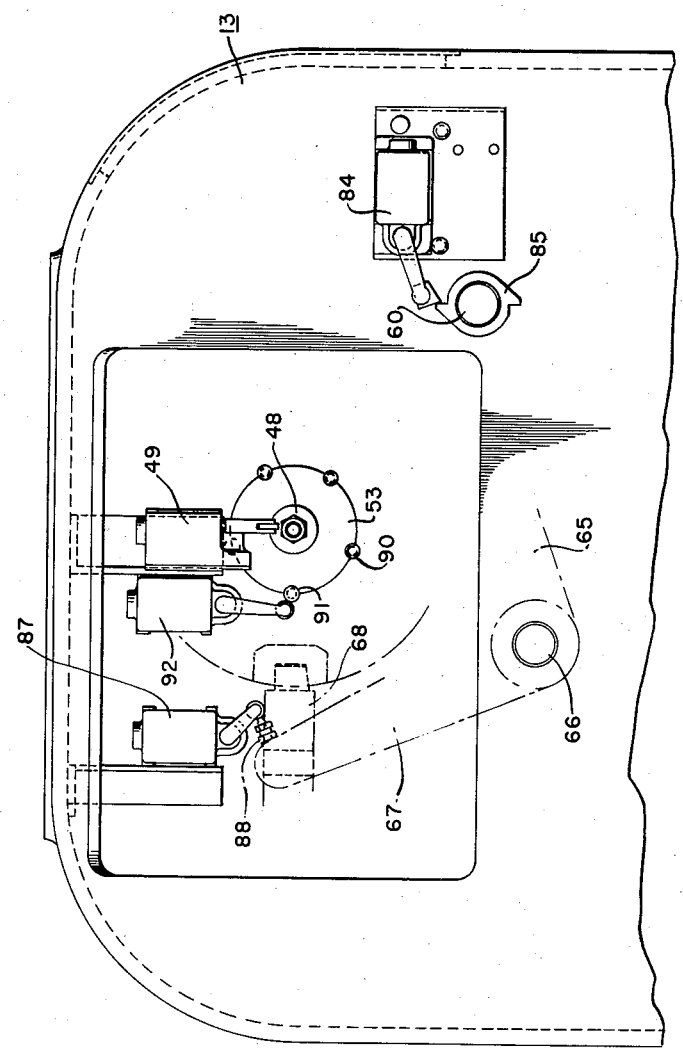
Figure 5 is an end view similar to Figure 3 and principally showing the electrical switches.

The Figure 5 better shows the arrangement of the electrical switches also contained in the outer support 13. A second limit switch 84 is actuated by a rotary cam 85. This rotary cam 85 is fixed on the shaft 60 for rotation therewith; and hence, when the rotary arm 59 makes a 180 degree revolution, the rotary cam 85 does likewise to actuate the second limit switch 84. A third limit switch 87 is actuated by an adjustable stud 88 carried on the lock bolt lever end 67. Five tapped holes 90 are provided in the indexing disc 53. Studs 91 may be carried in one or more of these holes 90 to actuate a fourth limit switch 92.

The Figure 4 shows a fifth limit switch 94 which is actuated by the shifting fork 80.

Figure 6:
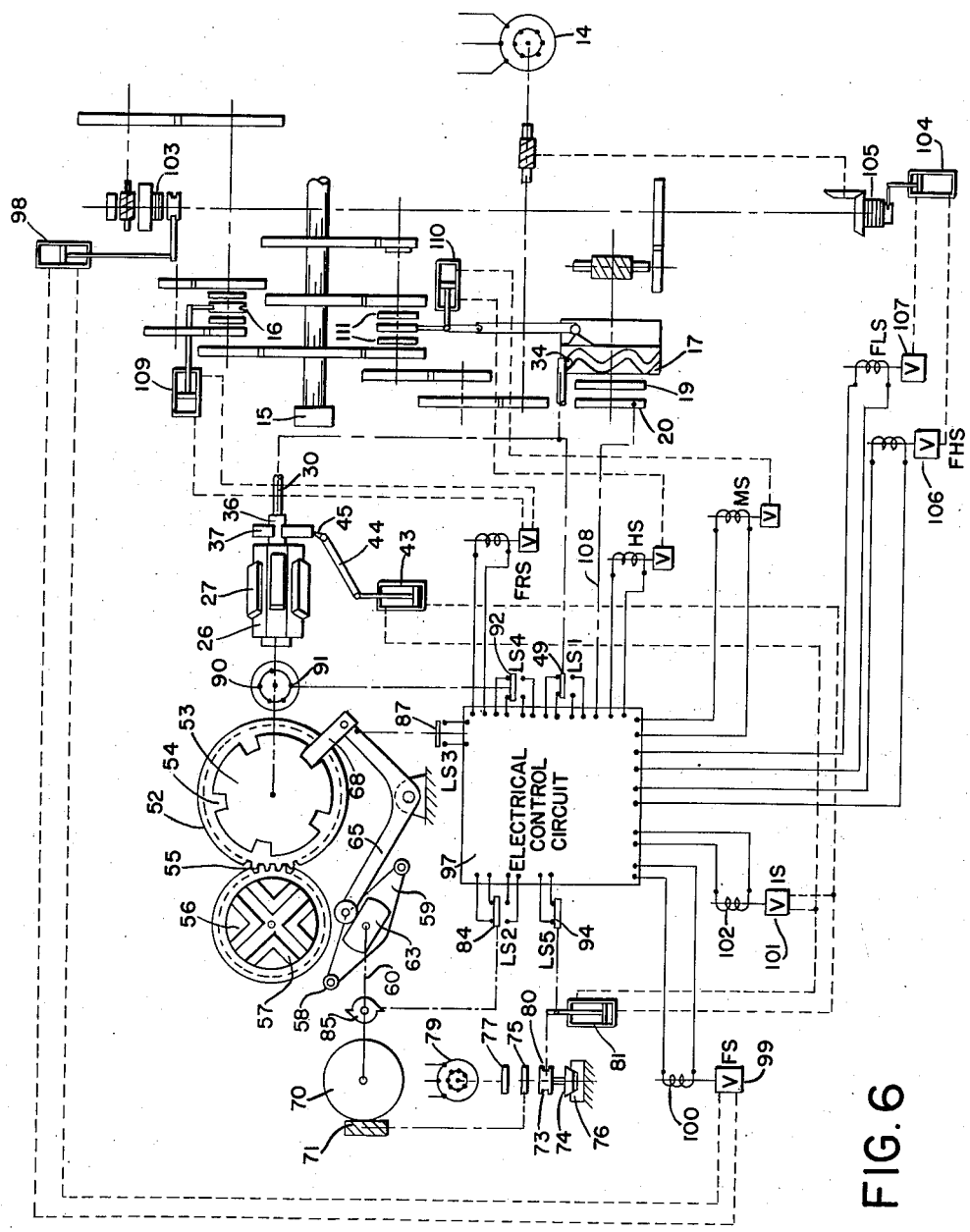
Figure 6 is a schematic diagram showing the electrical and pneumatic controls and gear trains.

Figure 6 shows schematically the electrical and pneumatic systems in conjunction with the gear train. An electrical control circuit 97 has connected to it the five limit switches 49, 84, 87, 92, and 94. A pneumatic cylinder 98 controls a low feed clutch 103, and the cylinder 98 is in turn controlled by a 4-way valve 99. A solenoid 100 actuates the valve 99, and the solenoid 100 is connected to the electrical control circuit 97. A pneumatic cylinder 104 controls a high speed clutch 105, and the cylinder 104 is controlled by valves 106 and 107.

The air cylinder 43 is shown as operating the clamp mechanism 37. The pneumatic cylinder 81 is connected pneumatically in parallel with the pneumatic cylinder 43. Both are controlled by a 4-way valve 101 actuated by a solenoid 102 connected to the electrical control circuit 97. All valves have pump connections not shown.

*Operation*

A connection 108 between the electrical control circuit 97 and the main cam shaft indicates that rotation of such shaft may also be utilized to control a pneumatic motor 109 operating the feed range clutch 16 and to control a pneumatic cylinder 110 to operate clutches 111 controlling the speed of the spindle 15.

The main cam drum 17 will carry cams for feed and return of the turret slides 27. The Figure 6 is shown with the turret 26 locked in place as in the case of feed and return movement of the turret slides 27. When the turret slides and draw rod 30 return to one extreme position, the switch actuating disc 48 will actuate the first limit switch 49. The electrical control circuit 97 is thereby given a signal to de-energize the solenoid 100. This conditions the 4-way valve 99 to release the low feed clutch 103. Also the high speed clutch 105 is released. Further, the indexing solenoid 102 is energized moving the 4-way valve 101 to operate both pneumatic cylinders 43 and 81. As shown in Figure 6, the pistons in these cylinders are raised; and thus, the toggle cam 45 releases the clamp mechanism 37. Further, the shifting fork 80 releases the brake 74—76 on the worm 71 and connects the clutch 75—77. The indexing motor 79 is a constantly running motor during operation of the machine tool; hence, with the engagement of the clutch, the worm 71 rotates to drive the worm wheel 70, the shaft 60, and the arms 59 and cams 63. The cam 63 is so phased relative to the arm 59 that this cam 63 first operates the lock bolt lever 65 to withdraw the lock bolt 68 from the co-operating notch 54. The movement of the lock bolt lever 65 operates the third limit switch 87, and this is a safety precaution to make certain that the feed clutches 103 and 105 are disengaged to stop rotation of the cam drum 17; and hence, stop feed movements of the slides 27. Continued rotation of the arm 59 brings the cam roller 58 into engagement with one pair of roller guides 57. This gives a rotation of 90 degrees to the Geneva gear 56, and through the gears 55 and 52 gives a rotation of 72 degrees to the indexing disc 53. The locking cam 63 then causes the lock bolt lever 65 to pivot to advance the lock bolt 68 into the next notch 54. The turret 26 is thus locked at one end. The cam shaft 60 continues to turn from the indexing motor 79 until the rotary cam 85 has completed a 180 degree revolution. This cam 85 then actuates the second limit switch 84. This gives a signal to the electrical control circuit 97 to stop the indexing. It does this by de-energizing the indexing solenoid 102 to move downwardly the pistons in the pneumatic cylinders 43 and 81. The shifting fork 80, therefore, causes the worm 71 to be braked to the outer support 13, and the toggle cam 45 causes the cylindrical turret extension 36 to be clamped to the main frame 12 by the clamp mechanism 37. Thus, the turret is clamped at both ends so that it cannot be moved or twisted out of alignment for the next portion of the operating cycle. When the third limit switch 87 is again actuated by the lock bolt 68 seating in a notch, the electrical control circuit is conditioned for resumption of the rotation of cam drum 17. Feed movement does not commence, however, until the pneumatic cylinders 43 and 81 have been actuated downwardly because the fifth limit switch 94 is a safety switch. This limit switch 94 prevents resumption of feed by either the clutches 103 or 105 until the indexing is completed and both ends of the turret 26 are clamped to the frame. When the rotary cam 85 has completed its 180 degree rotation and actuated the second limit switch 84, the third limit switch 87 will have been actuated. Upon braking of the worm 71, the fifth limit switch 94 will be actuated. Thus, the feed solenoid 100 will be energized to re-engage the feed clutch 103. Thus, the indexing movement will have been completed and the feed of the turret slides 27 again initiated.

A stud 91 may be inserted in any of the tapped holes 90; and when so inserted, the fourth limit switch 92 will be actuated at the end of the 72 degree indexing movement of the turret. This fourth limit switch 92 will thus override the control normally established by the second limit switch 84; and hence, the clutch 75—77 will remain engaged. This means that the cam shaft 60 continues for another 180 degrees rotation to index the turret another 72 degrees. Such 72 degree rotational movements of the turret 26 will continue until a turret position is reached wherein there is no stud 91 in the corresponding tapped hole 90. Thus, if in the particular tooling set up one or more of the turret faces are not needed, a stud 91 may be threaded into the appropriate tapped holes 90 to skip this turret position.

The entire indexing may be accomplished in a short interval of time. In many cases, production may be increased from five to ten times over the old machines having the cam drum indexing the turret. Further, the spindle speed need not be stepped up in order to achieve slightly faster indexing; and thus, the tools on the forming or cut-off slides may remain engaged with the workpiece and perform work independently of the turret, and continuously perform work for two or even three work operations by the turret slides. It is no longer necessary to increase the entire cycle time merely to obtain a sufficiently long time during one of the end operations between indexes so that a long forming operation from the slides 21 or 22 could be completed. Thus, the invention provides for an independent Geneva gear movement to control the indexing mechanism which is controlled by movement of the turret, yet powered by an independent electric motor. Further, this indexing mechanism provides for positively clamping the turret at both ends to prevent twisting or movement during tool operation.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a single spindle automatic machine tool having a frame, a hollow turret mechanism journalled in said frame for rotation about a substantially horizontal axis, a main cam drum rotatable in said frame, a draw rod extending coaxially through and carried in said hollow turret, a cam follower on said draw rod co-operating with said cam drum to effect longitudinal movement of said draw rod, a plurality of axially parallel ways on said turret, a plurality of tool slides on said ways, a pull sleeve on said draw rod cooperable with each of said slides for longitudinally moving said slides in unison with said draw rod, an axial cylindrical extension on said turret in said frame, an indexing disc and a Geneva gear rotatable with said turret in said frame, a rotary arm journalled in said frame and co-operating with said Geneva gear to index same by at least a partial rotation thereof, a worm and worm wheel to rotate said rotary arm, an electric motor, a clutch disposed to connect said worm to said motor, a second motor to operate said clutch, an indexing switch actuated by movement of said draw rod to one extreme position and connected to control said second motor, a locking cam rotatable with said rotary arm, a lock bolt co-operating with said indexing disc, said locking cam causing unlocking of said indexing disc by said lock bolt prior to movement of said Geneva gear by said rotary arm and effecting locking of said indexing disc subsequent to completion of indexing of said Geneva gear by said rotary arm, a clamping mechanism carried in said frame to clamp said cylindrical extension of said turret to said frame, a second switch controlled by rotation of said rotary arm to operate said second motor to release said clutch and to operate said clamping mechanism, and a third switch operated in accordance with movement of said lock bolt to override the control effected by said second switch until said indexing disc is locked.

2. In an automatic machine tool having a frame, a turret journalled in said frame, a main cam drum rotatable in said frame, a plurality of tool slides on said turret, a cam follower co-operating with said cam drum to effect longitudinal feed movement of said turret slides, an axial cylindrical extension on said turret in said frame, an indexing disc rotatable with said turret in said frame, at least one notch in said indexing disc, a Geneva gear rotatable with said indexing disc, a rotary arm journalled in said frame and co-operating with said Geneva gear to index same by at least a partial rotation thereof, a worm wheel rotatable with said rotary arm, a worm meshing with said worm wheel and journalled in said frame, an electric motor, a clutch and brake assembly disposed to selectively connect said worm to said motor and to said frame, a pneumatic cylinder to operate said clutch and brake assembly, an indexing switch actuated by movement of said slides to one extreme position and connected to control said pneumatic cylinder, a locking cam rotatable with said rotary arm, a lock bolt co-operating with said at least one notch and operable by said locking cam, said locking cam causing withdrawal of said locking bolt from a notch prior to movement of said Geneva gear by said rotary arm and effecting advancement of said lock bolt into a notch subsequent to completion of indexing of said Geneva gear by said rotary arm, a clamping mechanism carried in said frame to clamp said cylindrical extension of said turret to said frame, a second switch controlled by rotation of said rotary arm to operate said pneumatic cylinder to brake said worm to said frame and to operate said clamping mechanism, and a third switch operated in accordance with movement of said lock bolt to override the control effected by said second switch until said lock bolt is advanced into a notch.

3. In an automatic machine tool having a frame, a turret journalled in said frame for rotation, a main cam drum rotatable in said frame, a plurality of tool slides on said turret, a cam follower co-operating with said cam drum to effect feed movement of said turret slides, an indexing disc rotatable with said turret in said frame, at least one notch in said indexing disc, a Geneva gear rotatable with said indexing disc, a rotary arm journalled in said frame and co-operating with said Geneva gear to index same by at least a partial rotation thereof, a worm wheel rotatable with said rotary arm, a worm meshing with said worm wheel and journalled in said frame, an electric motor, a clutch and brake assembly disposed to selectively connect said worm to said motor and to said frame, a pneumatic cylinder to operate said clutch and brake assembly, an indexing switch actuated by movement to one extreme position of at least one of said slides and connected to control said pneumatic cylinder, a locking cam rotatable with said rotary arm, a cam follower lever pivoted by said locking cam to operate a lock bolt co-operating with said at least one notch, said locking cam causing withdrawal of said locking bolt from a notch prior to movement of said Geneva gear by said rotary arm and effecting advancement of said lock bolt into a notch subsequent to completion of indexing of said Geneva gear by said rotary arm, a second switch controlled by rotation of said rotary arm to operate said pneumatic cylinder to brake said worm to said frame, a third switch operated by said lever to override the control effected by said second switch until said lock bolt is advanced into a notch, a fourth switch actuable by said turret rotation and connected to override the control effected by said second switch and keep said clutch engaged to index said turret to another position, and a fifth switch operated by said pneumatic cylinder to control rotation of said main cam drum.

4. In an automatic machine tool having a frame, a hollow turret mechanism journalled in said frame for rotation, a main cam drum rotatable in said frame, a draw rod, a cam follower on said draw rod co-operating with said cam drum to effect longitudinal feed movement of said draw rod, a plurality of ways on said turret, a plurality of tool slides on said ways, a pull sleeve on said draw rod co-operable with each of said slides for longitudinally moving said slides in unison with said draw rod, an axial cylindrical extension on said turret in said frame, an indexing gear and an indexing disc rotatable with said turret in said frame, at least one notch in said indexing disc, a Geneva gear rotatable with said indexing gear, a rotary arm journalled in said frame and co-operating with said Geneva gear to index same by at least a partial rotation thereof, a worm wheel fixed to said rotary arm, a worm meshing with said worm wheel and journalled in said frame, an electric motor, a clutch and brake assembly disposed to alternately connect said worm to said motor and to said frame, a pneumatic cylinder to operate said clutch and brake assembly, an indexing switch actuated by movement to one extreme position of at least one of said slides and connected to control said pneumatic cylinder, a locking cam on said rotary arm, a cam follower lever pivoted by said locking cam to operate a lock bolt co-operating with said at least one notch, said locking cam causing withdrawal of said locking bolt from a notch prior to movement of said Geneva gear by said rotary arm and effecting advancement of said lock bolt into a notch subsequent to completion of indexing of said Geneva gear by said rotary arm, a clamping mechanism carried in said frame to clamp said cylindrical extension of said turret to said frame, a second switch controlled by rotation of said rotary arm to operate said pneumatic cylinder to brake said worm to said frame and to operate said clamping mechanism a third switch operated by said lever to override the control effected by said second switch until said lock bolt is advanced into a notch, a fourth switch actuable by said turret rotation and connected to override the control effected by said second switch and keep said clutch engaged to index said turret to another position, and a fifth switch operated by said pneumatic cylinder to control rotation of said main cam drum.

5. In a single spindle automatic machine tool having a frame, a hollow turret mechanism journalled in said frame for rotation about a substantially horizontal axis, a main cam drum rotatable in said frame, a draw rod extending coaxially through and carried in said hollow turret, a cam follower on said draw rod co-operating with said cam drum to effect longitudinal movement of said draw rod, a plurality of axially parallel ways on said turret, a plurality of tool slides on said ways, a pull sleeve on said draw rod co-operable with each of said slides for longitudinally moving said slides in unison with said draw rod, an axial cylindrical extension on said turret in said frame, an indexing gear and an indexing disc coaxially fixed to said turret in said frame, notches in said indexing disc of a number at least equal to the number of said slides, a drive gear journalled in said frame and meshing with said indexing gear, a Geneva gear fixed to said drive gear, a double ended rotary arm journalled in said frame and co-operating with said Geneva gear to index same by a partial rotation thereof, a worm wheel fixed to said rotary arm, a worm meshing with said worm wheel end journalled in said frame, an electric motor, a clutch and brake assembly disposed to selectively connect said worm to said motor and to said frame, a pneumatic cylinder to operate said clutch and brake assembly, an indexing switch actuated by movement of said draw rod to one extreme position and connected to control said pneumatic cylinder, a double sided cam on said rotary arm, a cam follower lever pivoted by said double sided cam to operate a lock bolt co-operating with each of said notches when in a locking position, said double sided cam causing withdrawal of said locking bolt from a notch prior to movement of said Geneva gear by said rotary arm and effecting advancement of said lock bolt into a notch subsequent to completion of indexing of said Geneva gear by said rotary arm, a clamping mechanism carried in said frame to clamp said cylindrical extension of said turret to said frame, a second switch controlled by rotation of said rotary arm to operate said pneumatic cylinder to brake said worm to said frame and to operate said clamping mechanism, a third switch operated by said lever to override the control effected by said second switch until said lock bolt is advanced into a notch, dogs positionable on said indexing disc is positions equal in number to said plurality of slides, a fourth switch actuable by said dogs and connected to override the control effected by said second switch and keep said clutch engaged to index said turret to another position, and a fifth switch operated by said pneumatic cylinder to control rotation of said main cam drum.

6. In a single spindle automatic machine tool having a base with a main frame and an outer support, a hollow turret mechanism extending between said main frame and said outer support and journalled therein for rotation about a substantially horizontal axis, a main cam drum rotatable in said main frame, a draw rod extending coaxially through and carried in said hollow turret, a cam follower on said draw rod co-operating with said cam drum to effect longitudinal movement of said draw rod, a plurality of axially parallel ways on said turret, a plurality of tool slides on said ways, a pull sleeve on said draw rod co-operable with each of said slides for longitudinally moving said slide in unison with said draw rod, an axial cylindrical extension on said turret in said main frame, an indexing gear and an indexing disc coaxially fixed to said turret in said outer support, radially disposed notches in said indexing disc equal in number to said plurality of slides, a drive gear journalled in said outer support and meshing with said indexing gear, a Geneva gear fixed to said drive gear, a double ended rotary arm journalled in said outer support and co-operating with said Geneva gear to index same by a partial rotation thereof, a worm wheel fixed to said rotary arm, a worm meshing with said worm wheel and journalled in said outer support, a constantly running electric motor, a clutch and brake assembly disposed to selectively connect said worm to said motor and to said outer support, a pneumatic cylinder to operate said clutch and brake assembly, an indexing switch actuated by movement of said draw rod to one extreme position and connected to control said pneumatic cylinder, a double sided cam on said rotary arm, a cam follower lever pivoted by said double sided cam to operate a lock bolt co-operating with each of said notches when in a locking position, said double sided cam causing withdrawal of said locking bolt from a notch prior to movement of said Geneva gear by said rotary arm and effecting advancement of said lock bolt into a notch subsequent to completion of indexing of said Geneva gear by said rotary arm, a clamping mechanism carried in said main frame to clamp said cylindrical extension of said turret to said frame, a second switch controlled by rotation of said rotary arm to operate said pneumatic cylinder to brake said worm to said outer support and to operate said clamping mechanism, a third switch operated by said lever to override the control effected by said second switch until said lock bolt is advanced into a notch, dogs positionable on said indexing disc in positions equal in number to said plurality of slides, a fourth switch actuable by said dogs and connected to override the control effected by said second switch and keep said clutch engaged to index said turret to another position, and a fifth switch operated by said pneumatic cylinder to control rotation of said main cam drum.

7. In a single spindle automatic machine tool having a base with a main frame and an outer support, a hollow turret mechanism extending between said main frame and said outer support and journalled therein for rotation about a substantially horizontal axis, a main cam drum rotatable in said main frame, a draw rod extending coaxially through and carried in said hollow turret, a cam follower on said draw rod co-operating with said cam drum to effect longitudinal movement of said draw rod, a plurality of axially parallel ways on said turret, a plurality of tool slides on said ways, a pull sleeve on said draw rod co-operable with each of said slides for longitudinally moving said slides in unison with said draw rod, an axial cylindrical extension on said turret in said main frame, an indexing gear and an indexing disc coaxially fixed to said turret in said outer support, radially disposed notches in said indexing disc equal in number to said plurality of slides, a drive gear journalled in said outer support and meshing with said indexing gear, a Geneva gear fixed to said drive gear, a double ended rotary arm journalled in said outer support and co-operating with said Geneva gear to index same by a partial rotation thereof, a worm wheel fixed to said rotary arm, a worm meshing with said worm wheel and journalled in said outer support, a constantly running electric motor, a clutch and brake assembly disposed to selectively connect said worm to said motor and to said outer support, a pneumatic cylinder to operate said clutch and brake assembly, an indexing switch actuated by movement of said draw rod to the extreme feed-out in the return position and connected to operate said pneumatic cylinder to clutching position, a double sided cam on said rotary arm, a cam follower lever pivoted by said double sided cam to operate a lock bolt co-operating with each of said notches when in a locking position, said double sided cam causing withdrawal of said locking bolt from a notch prior to movement of said Geneva gear by said rotary arm and effecting advancement of said lock bolt into a notch subsequent to completion of indexing of said Geneva gear by said rotary arm, a clamping mechanism carried in said main frame to clamp said cylindrical extension of said turret to said frame, a second switch actuated by rotation of said rotary arm by 180 degrees to operate said pneumatic cylinder to brake position to brake said worm to said outer support and actuate said clamping mechanism to clamp said turret cylindrical extension to said frame, a third switch operated by said lever to override the control effected by said second switch until said lock bolt is advanced into a notch, dogs positionable on said indexing disc in positions equal in number to said plurality of slides, a fourth switch actuable by said dogs and connected to override the control effected by said second switch and keep said clutch engaged to index said turret to another position, and a fifth switch operated by said pneumatic cylinder when in clutch position to stop rotation of said main cam drum and permit rotation of said main cam drum when said pneumatic cylinder is in brake position.

References Cited in the file of this patent

UNITED STATES PATENTS

| | | |
|---|---|---|
| 1,975,007 | Kingsburry | Sept. 25, 1934 |
| 2,255,199 | Van Hamersveld | Sept. 9, 1941 |
| 2,291,382 | Duglin | July 28, 1942 |
| 2,464,844 | Bodmer | Mar. 22, 1949 |
| 2,464,845 | Bodmer | Mar. 22, 1949 |
| 2,628,414 | Montgomery | Feb. 17, 1953 |